US005091127A

United States Patent [19]

Soofi

[11] Patent Number: 5,091,127

[45] Date of Patent: Feb. 25, 1992

[54] BUBBLE PACK PLASTIC FILMS AS PATTERNS FOR PRODUCING DIMPLED EFFECTS IN CAST CERAMIC PIECES

[75] Inventor: Madjid Soofi, St. Charles, Ill.

[73] Assignee: Magneco/Metrel, Inc., Addison, Ill.

[21] Appl. No.: 552,865

[22] Filed: Jul. 16, 1990

[51] Int. Cl.[5] .......... C04B 33/32; B28B 7/30; B28B 7/36

[52] U.S. Cl. .......... 264/56; 264/313; 264/338

[58] Field of Search .......... 264/338, 56, 313; 249/112

[56] References Cited

U.S. PATENT DOCUMENTS 4,840,654 6/1989 Pryor .......... 65/18.1

FOREIGN PATENT DOCUMENTS 2525011 12/1976 Fed. Rep. of Germany .

OTHER PUBLICATIONS

"Air Bubble Cushioning Materials as Diverse as Your Needs," published by Astro-Valcour, Inc.-Publication date unknown.

*Primary Examiner*—James Lowe
*Assistant Examiner*—Christopher A. Fiorilla
*Attorney, Agent, or Firm*—John G. Premo

[57] ABSTRACT

Dimples can be produced in the surfaces of cast ceramic pieces by casting these pieces in a mold which contains as the dimple producing pattern a layer of bubble pack. In another embodiment of the invention, there is described the mold which incorporates bubble pack to produce dimpled effects in cast ceramic pieces.

1 Claim, 1 Drawing Sheet

BUBBLE PACK PLASTIC FILMS AS PATTERNS FOR PRODUCING DIMPLED EFFECTS IN CAST CERAMIC PIECES

Often it is desirable to produce designs in the surfaces of cast ceramic pieces. This is usually accomplished by hand working the partially set ceramic or molds are used which contain permanent patterns which produced the desired effects in the surface of the ceramic pieces. These patterns are oftentimes very expensive to produce and are subject to wear which necessitates frequent replacement.

SUMMARY OF THE INVENTION

The present invention is directed to the production of dimple-like depressions in ceramic pieces which uses a disposable pattern. It eliminates the necessity of using expensive permanent rigid patterns for producing such effects. The invention is particularly adapted to producing ceramic barriers, such as weirs, damns or baffles used in tundishes which, when dimpled provide a large surface area in their faces, thereby rendering them capable of scavenging alumina impurities from molten steel.

BRIEF DESCRIPTION OF THE DRAWINGS

Like parts have like numbers.

THE INVENTION

Figure 1:
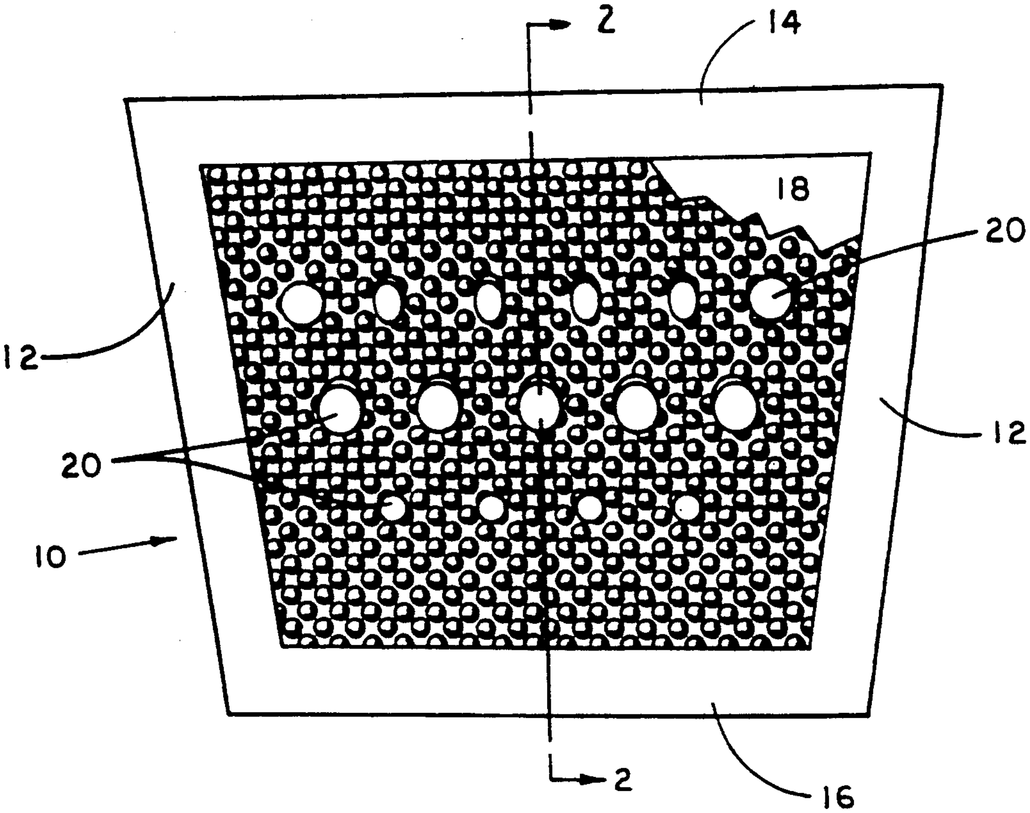
FIG. 1 is a top view of a open top ceramic mold used to produce baffles used in tundishes for pouring molten steel. It shows the bottom of the mold lined with the disposable pattern.

In its broadest aspects the invention provides a process for producing dimpled surfaces in cast ceramic pieces which comprises casting the ceramic piece desired to be produced in a mold which contains as the dimple producing pattern a layer of bubble pack. After the piece has been cast, from a wet ceramic slurry having a mortar-like consistency, it is allowed to set or cure sufficiently whereby it can be removed from the mold. In a preferred embodiment of the invention, the bubble pack is used to produce a dimpled effect in alumina shapes used as weirs, baffles or dams in tundishes used in the pouring of steel. These alumina shapes, after they are removed from the mold, are fired at a temperature in excess of 2000° C. to make them suitable for contacting molten steel.

The invention further comprises, in its broadest aspect, a mold for producing cast ceramic pieces. The mold is maybe either open top or it may be a two piece mold, similar to cope-drag molds used in making metal castings. Positioned within the mold at any point or points, where the cast object is to receive a dimpled effect, is a lining of bubble pack.

Bubble pack is a well-known commercial packing material. The term bubble pack, as used herein, refer to the well-known plastics sheet packing materials which consist of pockets of air encapsulated between a top and bottom layer of plastic film. These pockets of air may be further described as encapsulated pneumatic cells and are in the form of bubbles. The bubbles are not perfect spheres, but often are irregular in shape. When this sheeting is laid on the bottom of an open top ceramic mold, the mold now contains a flexible flat sheet pattern, which has uniformly spaced over its surface large numbers of bubbles filled with air which are in general in the shape of hemispheres.

The plastic sheeting of bubble pack may be selected for any number of thermoplastic resins. A typical material used to produce bubble pack sheeting is low density polyethylene. In certain instances bubble pack products may contain center layers of co-extruded nylon, which gives the bubble pack greater longevity, strength and vapor barrier characteristics. Bubble pack products are available from Astro-Valcour, Inc. Bubble pack products of the type thus described are presented in greater detail in the publication by Astro-Valcour, Inc. entitled, "Air Bubble Cushioning Materials as Diverse as Your Needs." The various disclosures in this publication relating to the composition and make-up of the bubble pack products are incorporated herein by reference. Astro-Valcour, Inc. sells bubble pack products of the type suitable for the use of the present invention under the Trademarks or Trade Names AVI SupraBubble, AstroCell and Astro-Cell Lite. The bubble pack products allow variation in the size of the dimpling sought to be produced in the finished ceramic piece. The bubbles in typical bubble pack range in size from ⅛ to about ½". Other sizes are available or can be produced.

For a better understanding of the invention, reference may be made to the drawings of which FIG. 1 shows an open top mold 10 having sides 12 and ends 14 and 16. The bottom of the mold is designated generally by the numeral 18.

Figure 2:
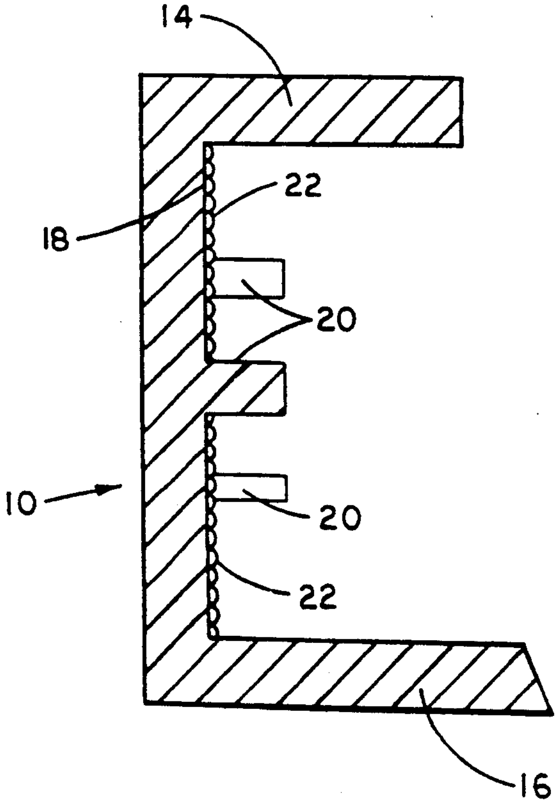
FIG. 2 is a side view taken across the lines 2—2 of FIG. 1.

The mold shown in the drawings in FIGS. 1 and 2 is to produce an alumina baffle used in a tundish to improve the circulation of the molten steel and to have formed on its front surface a plurality dimples which retain and trap alumina which is contained as an impurity in the steel. The baffle openings are designated generally by the numeral 20 with the bubble pack, which is laid on the bottom of the mold 18, by the numeral 22. This is shown to best advantage in FIG. 2.

Since the bubble pack material is made of a thin plastic material, it is possible to readily cut the film to fit it around various apertures or protrusions or to place it anywhere in the mold where it is desired to produce dimples in the finished ceramic piece.

In a mold such as shown in FIGS. 1 and 2, alumina mortar of a very thick consistency would be poured into such a mold, troweled smooth and then allowed to set until it has sufficient green strength to make it capable of being handled as a solid. It would then be removed from the mold. Any of the bubble pack material that may remain on the surface of the piece could be left there without stripping since the alumina baffle would be fired at a temperature in excess of 2000° C. which would burn off any residual bubble pack remaining. Optionally mold release sprays can be coated on the bubble back pattern.

While the invention has been specifically described with respect to barriers for tundishes, it is to be understood that the process and molds can be used to produce a variety of ceramic pieces, such as decorative bricks, tiles, ceramic containers, such as vases and pots, ceramic lamps and other articles where it is desired to have an unusual dimpled or textured effect placed in the surface of such ceramic articles.

Having thus described my invention, it is claimed as follows:

1. A process for producing a dimpled surfaced on an alumina tundish baffle which comprises the steps of:

a) casting an alumina slurry having a mortar like consistency in a tundish shaped mold which contains patterns for producing openings in the baffle which mold also contains bubble pack as a dimple producing disposable pattern;

b) allowing the cast alumina slurry to set;

c) removing the set alumina slurry, and then;

d) firing the set alumina slurry to produce a dimpled surface alumina tundish baffle.

* * * * *

UNITED STATES PATENT AND TRADEMARK OFFICE

CERTIFICATE OF CORRECTION

PATENT NO. : 5,091,127

DATED : February 25, 1992

INVENTOR(S) : Madjid Soofi

It is certified that error appears in the above-identified patent and that said Letters Patent is hereby corrected as shown below:

ON THE TITLE PAGE ,ITEM [56]:

IN THE REFERENCES CITED

On page 1, column 2, under the heading FOREIGN PATENT DOCUMENTS, after "Fed. Rep. of Germany" please insert --249/112--.

In column 1, line 21, please delete "damns" and substitute therefor --dams--.

In column 1, line 27, before "open" please delete "a" and substitute therefor --an--.

In column 1, line 67, before "sheet" please insert --plastic--.

In column 2, line 56, please delete "back" and substitute therefor --pack--.

UNITED STATES PATENT AND TRADEMARK OFFICE
CERTIFICATE OF CORRECTION

PATENT NO. : 5,091,127
DATED : February 25, 1992
INVENTOR(S) : Madjid Soofi

It is certified that error appears in the above-identified patent and that said Letters Patent is hereby corrected as shown below:

In claim 1, line 1, please delete "surfaced" and substitute therefor --surface--.

Signed and Sealed this

Twentieth Day of July, 1993

Attest:

MICHAEL K. KIRK

Attesting Officer

*Acting Commissioner of Patents and Trademarks*